United States Patent [19]

Sims et al.

[11] Patent Number: 5,285,262
[45] Date of Patent: Feb. 8, 1994

[54] HIGH RESOLUTION VIDEO ACQUISITION SYSTEM

[75] Inventors: S. Richard F. Sims, Huntsville; Billy J. Walker, Madison, both of Ala.

[73] Assignee: The United States of America as represented by the Secretary of the Army, Washington, D.C.

[21] Appl. No.: 888,081

[22] Filed: May 26, 1992

[51] Int. Cl.⁵ .................................. H04N 11/20
[52] U.S. Cl. ........................ 348/441; 348/500; 348/705
[58] Field of Search ............... 358/185, 181, 183, 149, 358/22, 21 R, 17, 11; 340/799, 721, 717; H04N 11/20

[56] References Cited

U.S. PATENT DOCUMENTS

| | | | |
|---|---|---|---|
| 3,947,826 | 3/1976 | Bockwoldt | 358/11 |
| 4,658,284 | 4/1987 | Kawamura et al. | 358/11 |
| 4,816,898 | 3/1989 | Farley et al. | 358/11 |
| 5,001,551 | 3/1991 | Otto | 358/11 |
| 5,008,754 | 4/1991 | Trevett et al. | 358/22 |
| 5,117,289 | 5/1992 | Farley et al. | 358/11 |
| 5,132,793 | 7/1992 | Hirahata et al. | 358/11 |
| 5,150,212 | 9/1992 | Han | 358/181 |
| 5,220,435 | 6/1993 | Yamaguchi et al. | 358/11 |
| 5,227,868 | 7/1993 | Choi | 358/17 |

Primary Examiner—Mark R. Powell
Assistant Examiner—Jeffrey S. Murrell
Attorney, Agent, or Firm—Hugh P. Nicholson; Freddie M. Bush

[57] ABSTRACT

A high resolution video acquisition system is disclosed that provides a recording capability at extended time with full resolution. Two real time digital scan converters, a synchronizing computer and image frame buffers cooperate to provide two high resolution Red, Green, and Blue 60 hertz video channel outputs for recording systems in digital format and for real time video display. The respective channels are sampled at approximately one frame per second per channel for approximately 2 hours, thereby providing a full resolution extended time recording capability.

5 Claims, 2 Drawing Sheets

HIGH RESOLUTION VIDEO ACQUISITION SYSTEM

DEDICATORY CLAUSE

The invention described herein may be manufactured, used, and licensed by or for the Government for governmental purposes without the payment to us of any royalties thereon.

BACKGROUND OF THE DISCLOSURE

Most high bandwidth video acquisition systems record data for only short periods of time and are incapable of acquiring continuous high resolution imagery. Typically and more particularly, standard commercial video systems operate by approximately a factor of 10 less than the high resolution video acquisition system. Current recording systems have no capability to capture high resolution imagery and simultaneously record data for long periods of time (i.e., hours in lieu of minutes). Additionally, established high bandwidth digital scan converters produce analog outputs exclusively.

SUMMARY OF THE INVENTION

A high resolution video acquisition system that provides a full resolution extended time (hours) digital recording capability. In the system, two real time digital scan converters, a synchronizing computer and frame buffers interface with a recording and display system to provide the capability to record two high resolution video channels sampled at approximately 1 frame/second/channel for over approximately 2 hours.

DESCRIPTION OF THE PREFERRED EMBODIMENT

Figure 1:
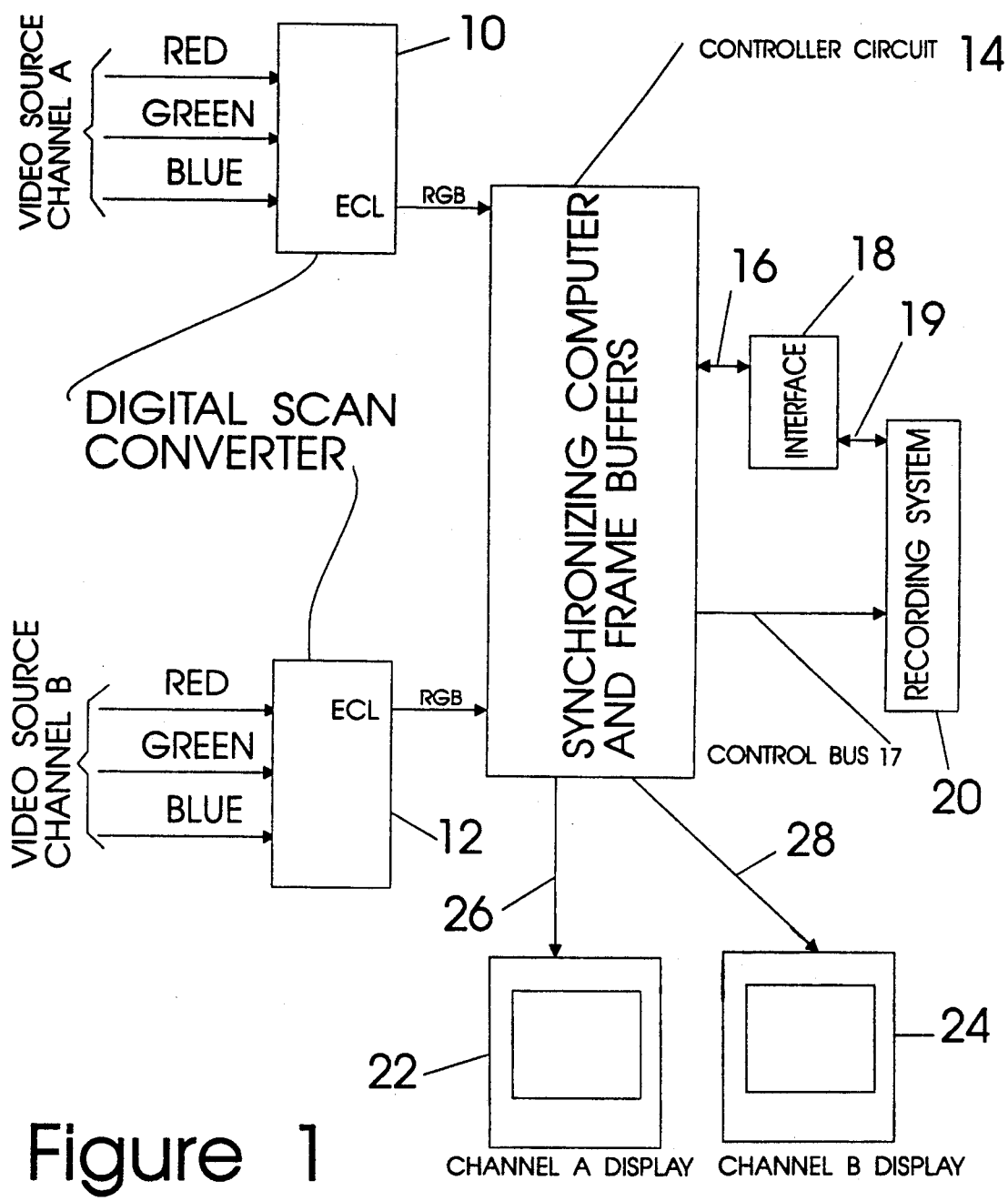
FIG. 1 is a block diagram of a preferred embodiment of the invention.

Referring now to the drawings wherein like numbers refer to like parts, FIG. 1 is a preferred embodiment of the high resolution video acquisition system wherein high bandwidth input video signals from separate sources (Channels A and B) are coupled into respective first and second real time digital scan converters 10 and 12. A controller circuit 14 is coupled to received outputs from converters 10 and 12 and is coupled via an input-output (I/O) bus 16 to provide a multiplexed interface to recording circuitry. Recording module interface 18, coupled to bus 16 to receive the multiplexed signal, is further coupled to a recording system 20. Data is recorded from first and second channels (channel A and channel B, shown generally only as inputs to respective converters 10 and 12). Each channel data that is being recorded is also displayed in a double buffered fashion on display systems 22 and 24 respectively through respective digital-to-analog (D/A) converted video buses 26 and 28. This display occurs while recording is in progress. This displayed video is generated as a non-interlaced 60 hertz full frame image.

Figure 2:
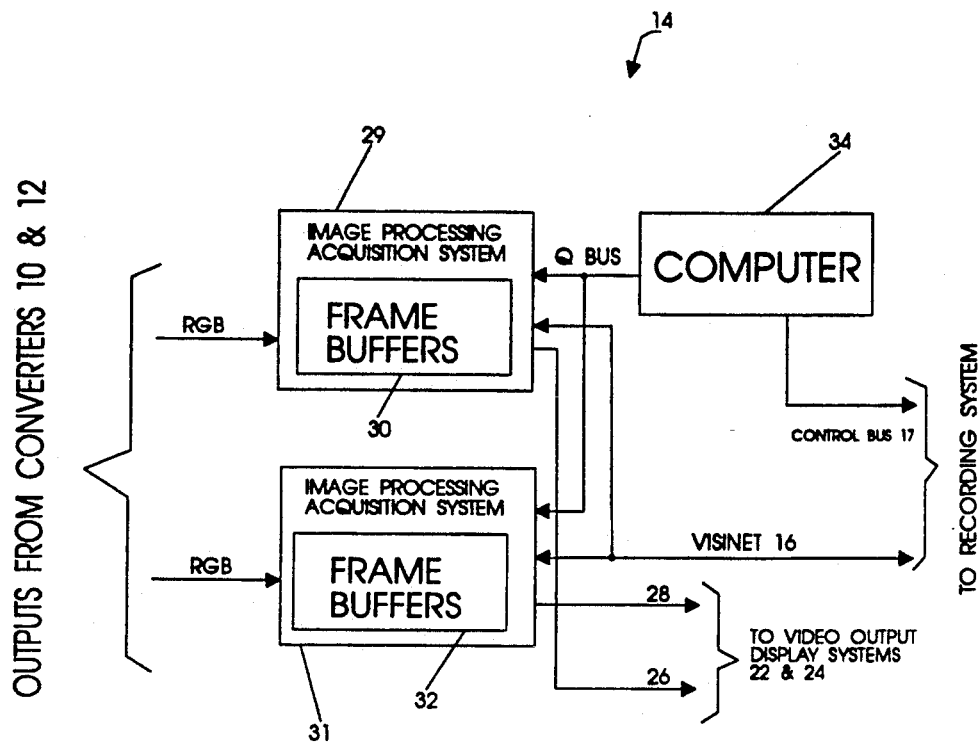
FIG. 2 is a more detailed block diagram of the controller circuit of FIG. 1.

As shown more particularly in FIG. 2, controller circuit 14 is a synchronizing computer and image processing acquisition systems (IPAS) with frame buffer circuits wherein outputs from converters 10 and 12 are coupled to frame buffers 30 and 32 within the IPAS systems 29 and 31. Video buses 26 and 28 provide the respective outputs to display systems 22 and 24. The synchronizing computer 34 is coupled via the Q bus to control the flow of data from IPAS systems 29 and 31 and buffers 30 and 32 via I/O bus 16.

The high bandwidth video sources (Channels A and B) each comprise three separate analog channels, one for each color—R for red, G for green, and B for blue. Each channel has an identical video format, except for the G (Green) channel which includes the synchronization signal. However, other variations to this format could include synchronization on all three channels and separate horizontal and vertical synchronization with no synchronization on the R, G, or B channels. Each video channel, typically 1280 by 1024 resolution elements, is generated at a 60 Hz rate with approximately 25% scan efficiency producing nearly a 50 Mhz signal input to the converters 10 and 12. Standard commercial video, by comparison, is an approximately 6 Mhz signal.

The high bandwidth digital scan converters 10 and 12 are Lyon Lamb model ILC devices which reduce the video signal bandwidth 2 to 1, taking non-interlaced analog RGB video as input and producing interlaced analog RGB video. The two units which were used with the high resolution video acquisition system were modified by Lyon Lamb to include an RGB digital emitter coupled logic (ECL) output interface which is coupled to controller circuit 14. This interface is compatible with an emitter coupled logic interface on the image processing acquisition systems 29 and 31.

Figure 3:
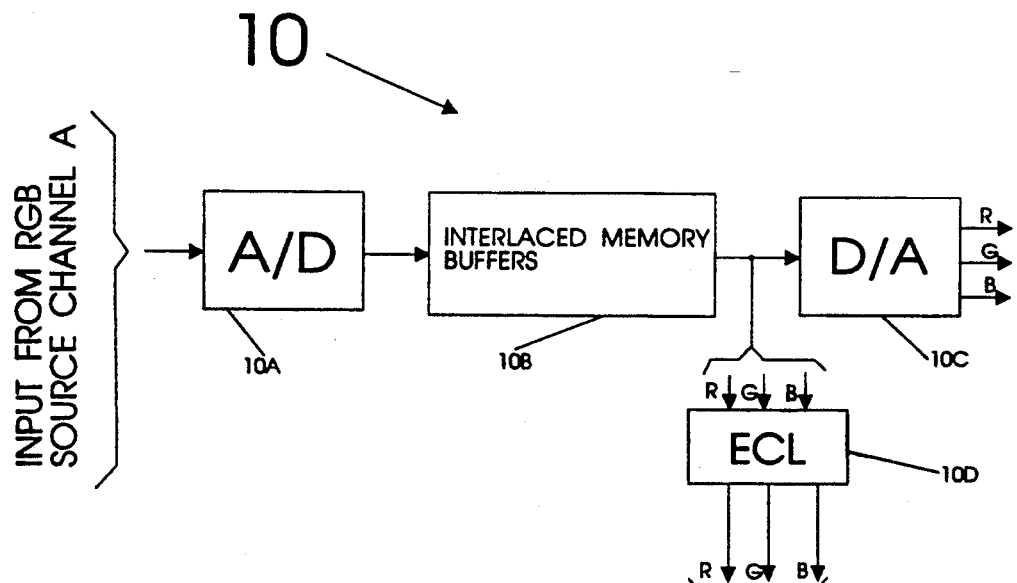
FIG. 3 is a signal flow diagram of the digital scan converters 10 and 12 of FIG. 1.

A more detailed block diagram of the converter 10 (and 12) is shown in FIG. 3. As shown typically for converter 10, the RGB analog input to the converter goes through an analog-to-digital converter 10A is then stored in memory buffer 10B memory and read out from buffer 10B and interlaced at half the input rate. The data is then converted back to analog by a digital-to-analog (D/A) converter 10C. However, for the high resolution video acquisition system the D/A converter 10C is not used. Instead, the RGB signal output from memory buffer 10B in digital format is tapped and converted to provide an emitter coupled logic (ECL) output to the buffers in circuit 14.

The digital frame buffers 30 and 32 are an integral part of and embedded in respective image processing acquisition systems 29 and 31, such as but not limited to the Recognition Concepts Incorporated (RCI) Trapix Plus Units. At alternate intervals the data from each buffer is transferred. The synchronizing computer 34 is a Digital Equipment Corporation (DEC) Microvax II computer. This computer controls the flow of data from and to each of the digital frame buffers, multiplexes or selects the currently full buffer, and directs the transfer of the buffered data along bus 16. It concurrently directs the incoming RGB data channels to the appropriately available buffer. The system provides the capability to record two high resolution (1280×1024 pixel) Red, Green, and Blue 60 hertz video channels sampled at approximately 1 frame per second per channel for over approximately two hours.

In the record cycle, the high resolution video acquisition system operates by transferring data from each of the two high bandwidth RGB analog sources, Channels A and B, as shown in FIG. 1, into the high bandwidth digital scan converters 10 and 12. The digital scan converter produces an ECL digital video output in an interlaced format in 1/60 of a second per field of video. The two ECL digital data streams from converters 10 and 12 are then taken into the asynchronously controlled digital frame buffers 30 and 32. The synchronizing computer defines the timing for data transfer from the frame buffers onto the digital I/O bus 16 and places the control function on the control bus 17. The I/O bus 16 takes the multiplexed image data to the recording module interface 18, a Mercury Computer Inc. visinet to DCRSi interface, which formats it onto an 8 bit data bus 19 for coupling to recording device 20. The recorder 20, an AMPEX DCRSi, is also managed by the controller circuit 14 through the control bus 17. The recording cycle can be stopped at any time by an operator by pressing the space bar on the computer 34 console (not shown), or the recording can continue as long as a tape cassette on the recording device 20 is not full. The data that is being recorded from each channel is simultaneously displayed in a double buffered fashion on each of the displays 22 and 24, respectively, through the digital to analog converted video buses 26 and 28.

In the playback cycle, the high resolution video acquisition system operates by playing back a prerecorded tape cassette on the recorder 20. The synchronizing computer 34 places the control function on the control bus 17 for recorder 20 to replay the cassette. The data from this recorded cassette then goes on the recording devices data bus 19 through the recording module interface 18 onto the I/O bus 16 to the image processing acquisition systems 29 and 31. Computer 34 controls both the recording device 20, via control bus 17, and the data synchronization into the individual digital frame buffers 30 and 32 via the Q bus. The data is displayed after it fills the frame memories in each of the two digital frame buffers. These full frame memories are digital-to-analog converted on the video buses 26 and 28 and displayed on the displays 22 and 24.

Obviously many modifications and variations of the present invention are possible in the light of the above teachings. It is therefore to be understood that within the scope of the appended claims the invention may be practiced otherwise than as specifically described.

We claim:

1. A high resolution video acquisition system comprising: first and second digital scan converters each having multiple analog signal inputs and digital signal outputs; a controller circuit coupled to receive said digital signal outputs from the first and second converters; said controller circuit providing a multiplexed digital signal output of the inputs received from the first and second converters, and providing first and second separate outputs of the respective first and second converter outputs; said multiple analog signal inputs of each of said converters being receptive to multiple frequency or color input signals for coupling multiple input channel data, and said controller circuit multiplexed digital signal output providing signal data thereon for extended time recording and said controller circuit first and second outputs having signal data thereon for real time viewing in response to analog signal inputs on said digital scan converters.

2. A high resolution video acquisition system comprising: first and second digital scan converters each having multiple analog signal inputs and digital signal outputs; a controller circuit coupled to receive said digital signal outputs from the first and second converters; said controller circuit providing a multiplexed digital signal output of the inputs received from the first and second converters and providing first and second separate outputs of the respective first and second converter outputs; said multiple analog signal inputs of each of said converters being receptive to multiple frequency or color input signals, and said controller circuit multiplexed digital signal output having signal data thereon for extended time recording and said controller circuit first and second outputs having signal data thereon for real time viewing in response to analog signal inputs on said digital scan converters, and wherein each of said converters multiple analog signal inputs are responsive to respective Red, Green, and Blue analog signal inputs, and wherein said controller circuit is a synchronizing computer and first and second frame buffers, said computer being coupled to and controlling said frame buffers to provide said controller circuit multiplexed digital signal output and said first and second separate outputs.

3. A high resolution video acquisition system as set forth in claim 2 and further comprising: a recording circuit coupled to receive said controller circuit multiplexed output for high resolution extended time recording, and first and second display circuits coupled to respective controller circuit frame buffers for receiving and displaying said separate outputs.

4. A high resolution video acquisition system as set forth in claim 2, wherein said first and second frame buffers are coupled to receive the respective digital signal outputs from said first and second converters to provide said controller circuit multiplexed output therefrom.

5. In a video acquisition system wherein first and second video sources each provide first, second, and third video frequency analog signal channels as output data which are processed for recording for subsequent playback, the improvement comprising: first and second converters each having plural data inputs for receiving said first, second, and third video frequency analog signal channels and having plural emitter coupled logic (ECL) outputs for coupling first, second, and third signal channel data out of said converters in digital ECL data format that is representative of said video frequency analog signals; first and second frame buffers having plural inputs coupled to respective converter digital ECL outputs for receiving first, second and third signal channel data outputs in digital ECL data format and having buffer outputs coupled to provide multiplexed output of the digital ECL data; recording means coupled to respective buffer outputs to receive the multiplexed output of digital ECL data for recording; and a computer coupled to said frame buffers for controlling the multiplexing of the ECL data output.

* * * * *